United States Patent
Reed et al.

(10) Patent No.: US 10,687,466 B2
(45) Date of Patent: Jun. 23, 2020

(54) PREDICTIVE HEADER HEIGHT CONTROL SYSTEM

(71) Applicant: CNH Industrial America LLC, New Holland, PA (US)

(72) Inventors: Daniel Reed, Brownstown, PA (US); Eric L. Walker, Narvon, PA (US)

(73) Assignee: CNH Industrial America LLC, New Holland, PA (US)

(*) Notice: Subject to any disclaimer, the term of this patent is extended or adjusted under 35 U.S.C. 154(b) by 179 days.

(21) Appl. No.: 15/882,740

(22) Filed: Jan. 29, 2018

(65) Prior Publication Data
US 2019/0230855 A1    Aug. 1, 2019

(51) Int. Cl.
*A01D 41/14*   (2006.01)
*A01D 41/127*   (2006.01)
*G05D 1/02*   (2020.01)
*A01B 69/00*   (2006.01)

(52) U.S. Cl.
CPC .......... *A01D 41/141* (2013.01); *A01B 69/004* (2013.01); *A01D 41/127* (2013.01); *G05D 1/0278* (2013.01); *G05D 2201/0201* (2013.01)

(58) Field of Classification Search
CPC ......... G05D 1/0278; G05D 2201/0201; G05D 1/0274; A01D 41/141; A01D 41/127; A01B 69/004; A01B 69/008; B60W 2300/158
See application file for complete search history.

(56) References Cited

U.S. PATENT DOCUMENTS

| | | | |
|---|---|---|---|
| 5,704,200 A | 1/1998 | Chmielewski, Jr. et al. | |
| 5,931,882 A | 8/1999 | Fick et al. | |
| 5,995,895 A | 11/1999 | Watt et al. | |
| 6,044,316 A * | 3/2000 | Mullins | A01B 69/008 56/10.2 A |
| 6,377,881 B1 * | 4/2002 | Mullins | A01B 69/008 172/2 |
| 6,615,570 B2 | 9/2003 | Beck et al. | |

(Continued)

FOREIGN PATENT DOCUMENTS

| | | |
|---|---|---|
| CA | 2665589 A1 | 11/2010 |
| WO | 2015012774 A1 | 1/2015 |

OTHER PUBLICATIONS

Extended European Search report for European Application No. 19154137.4 dated Apr. 12, 2019 (six pages).

*Primary Examiner* — Arpad Fabian-Kovacs
(74) *Attorney, Agent, or Firm* — Peter Zacharias; Peter Sheldrake

(57) ABSTRACT

An agricultural vehicle comprises a chassis, a header carried by the chassis, an actuator system including a plurality of actuators linked to a frame of the header and configured to adjust an orientation of the header, a GPS device configured to output a GPS position of the vehicle, and a controller. The header includes a frame and one or more sensors carried by the frame. The controller is electrically coupled to the one or more sensors, the actuator system, and the GPS device. The controller is configured to receive from a memory a final orientation of the header associated with a GPS position at a second location on a last pass that is closest in distance to a GPS position at an upcoming location on the current pass, and activate one or more actuators to re-orient the header before the vehicle arrives at the upcoming location.

10 Claims, 3 Drawing Sheets

(56) References Cited

U.S. PATENT DOCUMENTS

| | | |
|---|---|---|
| 8,843,283 B2 | 9/2014 | Strelioff et al. |
| 8,942,893 B2 | 1/2015 | Rosa et al. |
| 9,510,508 B2 | 12/2016 | Jung |
| 9,585,309 B2 | 3/2017 | Posselius et al. |
| 9,615,501 B2 | 4/2017 | Pickett et al. |
| 2008/0177449 A1 | 7/2008 | Pickett et al. |
| 2008/0269956 A1* | 10/2008 | Dix ................... A01B 69/008 701/1 |
| 2011/0160968 A1 | 6/2011 | Van Bergeijk |
| 2012/0253760 A1* | 10/2012 | Zielke ................ A01D 41/127 703/2 |
| 2013/0184944 A1* | 7/2013 | Missotten ........... A01B 69/007 701/50 |
| 2014/0324272 A1* | 10/2014 | Madsen .............. A01B 69/008 701/28 |
| 2015/0234385 A1 | 8/2015 | Sandin et al. |
| 2016/0106038 A1 | 4/2016 | Boyd et al. |
| 2016/0113200 A1* | 4/2016 | Gofron ................ A01B 73/00 56/10.2 R |
| 2016/0360697 A1* | 12/2016 | Diaz ................... G05D 1/0061 |
| 2017/0064904 A1* | 3/2017 | Figgins ............... A01D 34/006 |
| 2017/0094901 A1* | 4/2017 | French, Jr. .......... A01D 41/127 |
| 2017/0118915 A1* | 5/2017 | Middelberg ......... A01B 69/008 |
| 2017/0311541 A1 | 11/2017 | Pankaj et al. |
| 2018/0122020 A1* | 5/2018 | Blank .................. A01B 76/00 |
| 2018/0271015 A1* | 9/2018 | Redden ............... A01D 41/127 |
| 2019/0069470 A1* | 3/2019 | Pfeiffer .............. A01D 41/127 |
| 2019/0129435 A1* | 5/2019 | Madsen ............. G01C 21/3602 |

\* cited by examiner

PREDICTIVE HEADER HEIGHT CONTROL SYSTEM

FIELD OF THE INVENTION

The present invention relates to agricultural vehicles and, more particularly, to agricultural harvesters equipped with a header.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves and is transported to a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

When a harvester is moving through the field, the header must be maintained at a certain height above the ground to harvest all the crop without damaging the header. Thus, when the terrain changes, the header must be re-positioned. In a conventional harvester, the header is re-positioned using data collected, by height and/or tilt sensors, on the current pass of the harvester through the field.

For example, in combines with headers that are rigidly attached to the combine feeder house, the combine is typically equipped with a header height control (HHC) system which adjusts the height and tilt angle of the header relative to the ground. The HHC system is particularly important to prevent the header from contacting objects in the field as the combine harvests crop material and furthermore helps to keep the cutting apparatus of the header at a desired height relative to the ground in order to obtain the desired crop collection. Known HHC systems include an actuator linked to a frame of the header, sensors which detect the height and/or tilt of the cutting apparatus relative to the ground, and a controller which controls the actuator based on the sensed height and/or tilt of the cutting apparatus.

One problem with conventional header control is that the system is completely reactive, relying only on data obtained from height and/or tilt sensors on the current harvesting path of the combine. Thus, when the terrain changes too quickly, the header is often not in the correct position. This may result in lost crop (e.g., header too high) or damage to the header (e.g., header too low). Additionally, because the height control system is completely reactive, ground speed of the combine is often limited by the header position and/or relief of the terrain, and thus the operator must decide upon the speed to drive the combine so as to not miss any crop and not damage the header. The conventional system thus relies to some extent upon operator judgement in selecting the correct driving speed, thereby introducing potential operator error which can decrease the efficiency of crop collection.

What is needed in the art is a HHC system that can overcome some of the previously described disadvantages of known HHC systems.

SUMMARY OF THE INVENTION

In accordance with an aspect of the present invention, there is provided an agricultural vehicle comprising a chassis, a header carried by the chassis, an actuator system including a plurality of actuators linked to a frame of the header and configured to adjust an orientation of the header, a GPS device configured to output a GPS position of the vehicle, and a controller. The header includes a frame and one or more sensors carried by the frame. The sensors are configured to output one or more sensor signals associated with an orientation of the header. Furthermore, the controller is electrically coupled to the one or more sensors, the actuator system, and the GPS device. At a first location on a current pass of the vehicle, the controller is configured to receive one or more sensor signals, determine a final orientation of the header based upon the received one or more sensor signals, receive a GPS position, store the final orientation and the associated GPS position in a memory, receive from the memory a final orientation of the header associated with a GPS position at a second location on a last pass that is closest in distance to a GPS position at an upcoming location on the current pass, and activate at least one actuator of the plurality of actuators to re-orient the header based upon the received final orientation of the header associated with the GPS position at the second location before the vehicle arrives at the upcoming location.

In accordance with another aspect of the present invention, the controller is further configured to activate at least one actuator of the plurality of actuators to re-orient the header to within a percentage of the received final orientation of the header associated with the GPS position at the second location before the vehicle arrives at the upcoming location, wherein the percentage is based upon a current speed of the agricultural vehicle.

In accordance with another aspect of the present invention, when the vehicle arrives at the upcoming location on the current pass, the controller is further configured to receive one or more second sensor signals, determine a second final orientation of the header based upon the received one or more second sensor signals, receive a second GPS position, store the second final orientation and the associated second GPS position in the memory, and activate at least one actuator of the plurality of actuators to further re-orient the header based upon the second final orientation of the header.

An advantage of the agricultural vehicle described herein is to provide a predictive header height control system for an agricultural vehicle that more accurately positions the header into a desired position and orientation with respect to the surface of the ground.

More specifically, the predictive HHC system of the present invention reduces the amount of reactive sensor travel by first predictively moving the sensors, based upon retrieving stored header orientation values obtained by the sensors on a last pass, before the sensors have arrived at an upcoming location in the current pass, thereby positioning the header close to its optimal settings before the header is reactively fine-tuned by utilizing newly obtained sensor data on the current path. Specifically, for large/abrupt changes (such as changes due to a terrace or water-way), the predictive HHC system more accurately positions the header such that the vehicle may be operated at a faster speed with less risk for header damage and with no loss in, or even higher, crop collection yields.

BRIEF DESCRIPTION OF THE DRAWINGS

The above-mentioned and other features and advantages of this invention, and the manner of attaining them, will become more apparent and the invention will be better understood by reference to the following description of exemplary embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
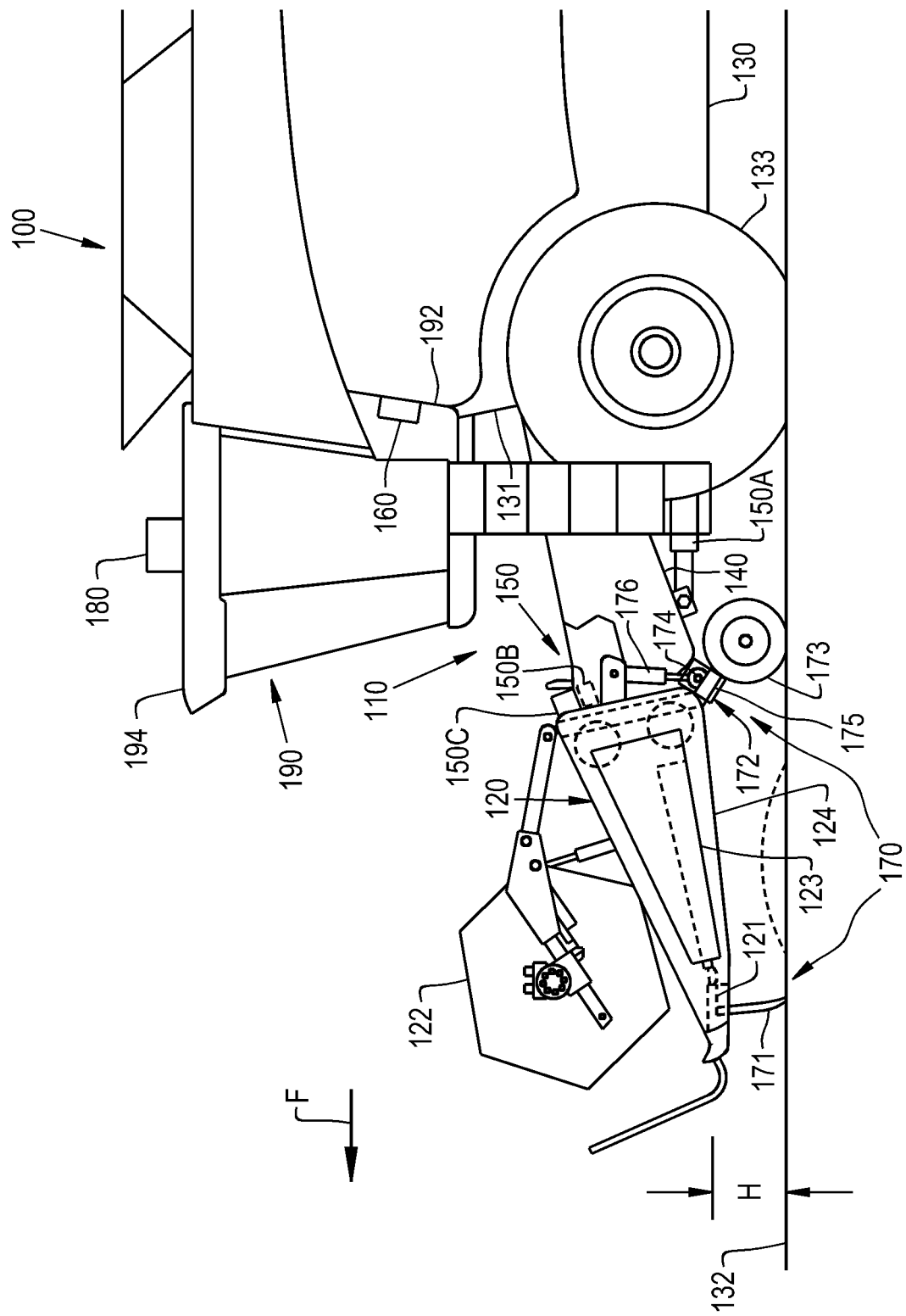
FIG. 1 is a side view of an exemplary embodiment of an agricultural vehicle formed in accordance with the present invention.

Referring now to the drawings, and more particularly to FIG. 1, an exemplary embodiment of an agricultural machine 100 formed in accordance with an embodiment of the present invention is shown, including a predictive header height control (HHC) system 110 operable for predictively controlling height and tilting adjustment of a header 120 carried on a front end 131 of a chassis 130 of machine 100, as machine 100 moves over a ground surface 132, as denoted by arrow F. Agricultural machine 100, also referred to as an agricultural vehicle, is a typical, self-propelled combine harvester having the chassis 130 carrying a conventionally configured and operable engine and power train that drives tracks or wheels 133. The engine can power a cutter 121 of header 120, which can include a conventionally configured and operable sickle cutter, disk cutters, or the like, as well as a reel 122, and gathering apparatus 123, which here is a draper belt system but could be an auger device, all of which are conventionally configured and operable.

A center region of header 120 is supported on machine 10 by a feeder 140, the front end of which is movable upwardly and downwardly relative to machine 100 for setting a height, denoted by height H in FIG. 1, of the cutter 121. The cut plants will then fall onto a floor or pan of header 120, aided by reel 122, and pass onto gathering apparatus 123. The cut plants are then carried by apparatus 123 to an inlet opening of feeder 140, which will induct the cut plants and carry them internally therethrough into machine 100 for processing, all in the conventional, well known manner.

To control the height, lateral tilting and fore-aft tilting of the header 120, the chassis 130 carries an actuator system 150 with actuators 150A, 150B, and 150C which can be linked to a frame 124 of the header 120 and/or the feeder 140. One or more of the actuators 150A, 150B, 150C can also be mounted to the chassis 130, if desired. The actuators 150A, 150B, 150C can be pneumatic or hydraulic cylinders or other types of actuators that exert forces on the frame 124, or a component connected to the frame 124 such as the feeder 140, in order to lift, lower and/or tilt the header 120 (i.e., re-orient the header). The actuator system 150 can include, for example, a height actuator 150A which is configured to vertically raise and lower the frame 124 to adjust the height of the header 120; a lateral tilt actuator 150B which is configured to adjust the lateral tilt of the frame 124, i.e., side-to-side tilting of the header 120 relative to the forward direction F; and a fore-aft actuator 150C which is configured to adjust the fore-aft tilt of the frame 124, i.e., tilting of the header 120 front-to-back relative to the forward direction F. It should be appreciated that reference to "tilt" and "tilting" of the header 120 herein can refer to both lateral and fore-aft tilting, unless only one of the types of tilt is specified. The actuator system 150 is electrically coupled to a controller 160 which sends signals to the actuators 150A, 150B, 150C in order to control the operation of the actuators 150A, 150B, 150C. The controller 160 may be mounted to a surface located within a cab 190 of the machine 100, such as a back wall 192 of the cab 190, for example. As used herein, the controller 160 is "electrically coupled" to the actuator system 150 in the sense that the controller 160 is electrically coupled to each actuator 150A, 150B, 150C of the actuator system 150 so the controller 160 can activate each actuator 150A, 150B, 3150C. The actuator system 150 and controller 160 can be configured so the controller 160 can activate each actuator 150A, 150B, 150C of the actuator system 150 independently of the other actuators. The controller 160 can include, for example, an electrical processing circuit or central processing unit and memory that allow the controller 160 to send and receive electrical signals to control various components of the vehicle 100, which will be described further herein. In the case of pneumatic or hydraulic cylinders, the controller 160 can control one or more valves (not shown) of the cylinder to fill or drain fluid from within the cylinder, as is known. It should be appreciated that other types of actuators 150A, 150B, 150C can be used other than cylinders, such as electrically powered actuators, in which case the controller 160 will control the mechanism that causes extension and retraction of the actuators 150A, 150B, 150C. It should be appreciated that while the actuator system 150 is shown and described as including three actuators 150A, 150B, and 150C, the actuator system 150 can have two actuators or may have more than three actuators to control positioning of the header 120 via positioning of the frame 124.

The header 120 may also include one or more sensors 170 electrically coupled to the controller 160, that indicate, either individually or in some combination, height of the header 120 (e.g., height H of the cutter 121) above the ground surface 132, lateral (i.e., side-to-side) tilting of the header 120 with respect to the forward direction F, and fore-aft (front-to-back) tilting of the header 120 with respect to the forward direction F, or in other words, orientation of the header 120 with respect to the ground surface 132 or with respect to the forward direction F.

For example, in one embodiment the controller 160 is electrically coupled to a cutter sensor 171 associated with the cutter 121 of the header 120. The cutter sensor 171 detects the height H of the cutter 121 relative to the ground surface 132 by contacting the ground surface 132 and flexing. Depending on the flexion of the cutter sensor 171, the cutter sensor 171 sends a cutter height signal, also referred to as a cutter sensor signal, to the controller 160 which has a magnitude indicating the height H of the cutter 121 relative to the ground surface 132. The controller 160 can maintain the cutter 121 at a desired height H relative to the ground surface 132 by comparing a difference between the magnitude of the cutter height signal and a stored pre-determined height threshold value, and activating one or more of the actuators 150A, 150B, 150C to raise, lower, and/or tilt the frame 124, based on the difference, so that the cutter 121 assumes the desired height (i.e., orientation) relative to the ground surface 132.

On flat ground surfaces 132, such as the ground surface 132 shown in FIG. 1, the cutter sensor 171 is typically sufficient to accurately control the height H of the cutter 121. However, when the ground surface is not level, such as when the vehicle 100 is traveling across non-flat terrain, such as a slope, certain instances can arise where the cutter sensor 171 may not convey sufficient information to the controller 160 to accurately control the height H and tilt angle of the header 120. To better follow the contour of such ground surfaces, and in another embodiment of the invention, the header 120 may optionally include a wheel sensor 172 which is associated with a gauge wheel 173 which is carried by the frame 124 of the header 120 behind the cutter 121. The wheel sensor 172 can include a mount 174 connected to the frame 124 of the header 120 and an arm 175 connecting the gauge wheel 173 to the mount 174. To allow the gauge wheel 173 to adjust to changes in height of the terrain as the vehicle 100 travels, the arm 175 can be pivotally connected to the mount 174 so the gauge wheel 173 can pivot relative to the mount 174 during travel. To keep the gauge wheel 173 engaged with the ground surface 132 as the vehicle 100 travels in the forward direction F, a spring 176 can be connected to the arm 175 that biases the gauge wheel 173 toward the ground surface 132. The wheel sensor 172 is configured to output a wheel position signal, also referred to as a wheel sensor signal, to the controller 160 which corresponds to a position of the gauge wheel 173, either linear or angular, relative to the mount 174.

The cutter 121, which is carried at a front (relative to the forward direction F) of the frame 124, and the gauge wheel 173, carried behind the cutter 121, have a separation distance relative to the forward direction F. Due to this separation distance, the cutter 121 and gauge wheel 173 can be traveling on two different grades (not shown) of the ground surface, or in other words, can be traveling over a terrain irregularity (i.e., a non-flat ground surface). The controller 160 may compare, for example, a difference between a received cutter height signal to a received wheel angle signal, wherein a magnitude of such a difference indicates the strength of the terrain irregularity. For example, if the received cutter height signal is large and the received wheel angle signal is very small or zero, then the cutter 121 is positioned above a steep incline while the gauge wheel is still on a flat surface, and based upon the large magnitude of the difference, the controller 160 determines the proper corrective action that should be taken by the one or more actuators to prevent a front portion of the header 120 from digging into the steep incline of the terrain. For example, the controller 160 may determine which of said actuators 150A, 150B, 150C to activate and in what manner so the header 120 follows the contour of the ground surface 132. In one embodiment, the controller 160 may activate one or more of actuators 150A, 150B, 150C to adjust the fore-aft tilt of the header 120.

Further, the controller 160 can be configured to take other factors into account, such as a speed of the vehicle 100 and a rate of change in the gauge wheel angle, to determine which of the actuators 150A, 150B, 150C to activate in order to avoid damage to the header 120.

Although the embodiment illustrated by FIG. 1 depicts a cutter sensor 171 combined with an optional wheel sensor 172, the scope of the present invention covers two or more cutter height sensors, configured as the above-described cutter sensor 171 and attached at various points on the frame 124 of the header 120, and two or more optional wheel sensors 172 attached at various points on the frame 124 of the header 120. For example, in one embodiment of the present invention, the header 120 includes two gauge wheels 173 with two associated wheel sensors 172. The wheel sensors 172 may be mounted on opposite sides of the frame 124 along a direction transverse to the forward direction F, and they may be referred to as left and right wheel sensors and left and right gauge wheels with respect to the forward direction F. The two wheel sensors 172 are configured to independently output corresponding wheel position signals to the controller 160 which corresponds to positions of the two associated gauge wheels 173, either linear or angular, relative to their respective mounts 174. Thus, the controller 160 may determine the lateral tilt of the header 120 by comparing the difference between the two wheel position signals, and based at least upon this difference, may activate one or more of the actuators 150A, 150B, 150C to tilt (and optionally in addition, may lower or raise) the frame 124 so that the header 120 and cutter 121 assume a desired orientation relative to the ground surface 132.

As discussed above, the controller 160 is electrically coupled to one or more sensors (e.g., cutter sensor(s) 171 and optional wheel sensor(s) 172) and the actuator system 150. In addition, and in a further embodiment of the invention, the controller 160 is electrically coupled to a global positioning system (GPS) device 180 carried by the chassis 130, preferable on an outside surface of the chassis 130, such as a top surface 194 of the cab 190. The GPS device 180 is any conventional global positioning system device configured to use satellite signals for determining a current global position of the device 180, and thus, the position of the machine 100.

In one embodiment of the present invention, the controller 160 is configured to receive, from the GPS device 180, a current position of the machine 100 as it harvests the crops, as well as associated sensor data comprising the sensor signals obtained by the one or more sensors at the current position of the machine 100. In addition, the controller 160 is configured to determine a preferred orientation of the header 120 (e.g., the height, fore-aft tilt and/or lateral tilt) based upon the received sensor data, and actuate the actuators accordingly to position the header 120 in the determined preferred orientation. Furthermore, the controller 160 is configured to store, in controller memory, for example, each current position of the machine 100 and the associated preferred orientation of the header 120, also referred to simply as the orientation of the header 120. In another embodiment of the invention, the controller 160 may also either determine, from subsequently received GPS signals, a current ground speed of the machine 100, or receive from the GPS device 180 the current ground speed of the machine 100, and store the ground speed associated with the current position and the associated orientation of the header 120.

In another embodiment of the invention, as described more fully below in conjunction with FIGS. 2-3, the controller 160 is configured to, on any given pass of the machine 100 through the field, receive from controller memory (not shown) past orientation values of the header 120 associated with a GPS position from a neighboring last pass to be used to initiate adjusting the header 120 (via the actuators) on a given current pass before the machine 100 reaches a GPS position on the current pass that is closest to the GPS position of the machine 100 on the neighboring last pass. In other words, the controller 160 of the predictive HHC system 110 of the present invention enables the header 120 to move towards an orientation (defined by height and tilt values) recorded in a last (i.e., previous) pass having a GPS position that is closest in distance to an upcoming GPS position in the current pass before the machine 100 (e.g., the header 120) reaches that position in the current pass. That is, the controller 160, using header orientation values recorded at a location in a last pass, predicts the orientation of the header at a future location in a current pass, where the spatial difference between the two locations, defined by the GPS coordinates of the two locations, is at a minimum, or at least close to a minimum.

In another embodiment of the invention, the controller 160, upon receiving the stored orientation of the header 120 from the last pass, predictively begins to move the header 120 such that the header 120 is within a certain percentage of the stored orientation when the machine 100 arrives (or slightly before when the machine 100 arrives) at the upcoming location in the current pass. Furthermore, when the machine 100 arrives (or slightly before when the machine 100 arrives) at the upcoming location in the current pass, the controller 160 uses newly received sensor data to further orientate the header 120 (i.e., to fine-tune the orientation of the header 120) in a reactive manner. Thus, in this embodiment of the invention, the predictive HHC system 110 uses a predictive/reactive algorithm to adjust (i.e., re-position or re-orientate) the header 120 as the machine 100 approaches an upcoming location in a current pass, in which the predictive component is based upon stored orientation values of the header 120 recorded in a last neighboring pass that are used to begin moving the header 120 to within some given percentage of the stored orientation values of the header 120, and in which the reactive component is based upon current sensor data (i.e., sensor data obtained (and subsequently stored) on the current pass at or near the upcoming location) to fine-tune the orientation of the header 120, such that the header 120 is correctly positioned when the machine 100 arrives at the upcoming location.

In another embodiment of the invention, the controller 160, upon receiving the stored orientation values of the header 120 (also referred to as the stored orientation of the header 120) from the last pass, predictively moves the header 120 to within a certain percentage of the stored orientation values, where the certain percentage is based upon current ground speed of the machine 100. For example, in an exemplary embodiment, at slower ground speeds the predictive HHC system 110 comprises a larger predictive component/reactive component ratio when compared to the predictive component/reactive component ratio employed at faster ground speeds. For example, at a given first ground speed, the predictive HHC system 110 may be mostly predictive, predictively moving the header 120 to within, for example, 10% of the tilt and height orientation values associated with a GPS position of a last pass that is nearest to an upcoming GPS position of the current pass, with any remaining adjustment (i.e., fine-tune adjustment) to the orientation of the header 120 being based upon currently (i.e., newly) obtained sensor data at (or nearly at) the upcoming position. However, at a given second ground speed, which is faster than the first ground speed, the predictive HHC system 110 may be less predictive, predictively moving the header 120 to within, for example, 20% of the tilt and height orientation values associated with a GPS position of a last pass that is nearest to an upcoming GPS position of the current pass, with any remaining adjustment to the orientation of the header 120 being based upon currently (i.e., newly) obtained sensor data at (or nearly at) the upcoming position.

In another embodiment of the invention, an operator of the machine 100 may adjust the settings of the controller 160 (via, for example, a controller user interface (not shown)) to set a correlation between ground speed and the percentage of predictivity employed by the predictive HHC system 110. For example, as discussed above, at higher ground speeds the controller 160 may be set to employ a smaller percentage of predictivity (e.g., operator sets controller 160 to re-positioning the header 120 to within 30% of stored last pass orientation values) and at lower ground speeds the controller 160 may be set to employ a larger percentage of predictivity (e.g., operator sets controller 160 to re-positioning the header 120 to within 5% of stored last pass orientation values). In this manner, an operator may tailor height control of the header 120, also referred to as orientation control of the header 120, to field conditions, header characteristics and acceptable crop loss, for example.

Figure 2:
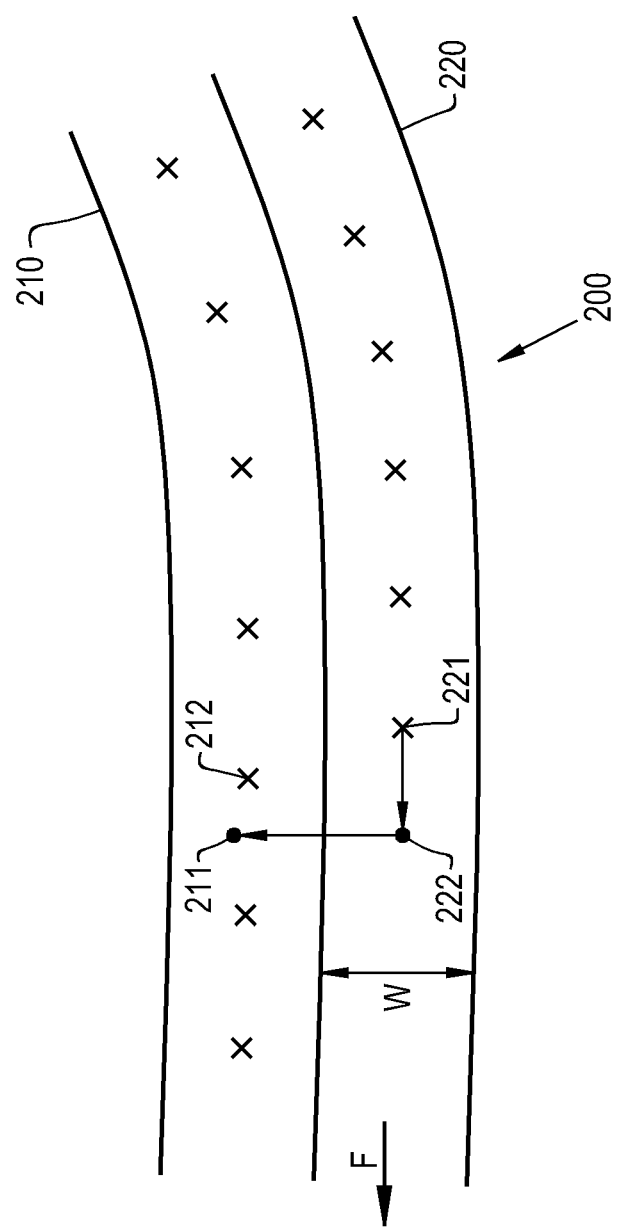
FIG. 2 is an exemplary embodiment of an overhead view of two paths, traversed by the agricultural vehicle illustrated in FIG. 1, formed in accordance with the present invention.

FIG. 2 is an overhead schematic of two passes 200 traversed by the machine 100, as illustrated in FIG. 1, according to an embodiment of the present invention. The two passes 200 comprise a last pass 210, a current pass 220, a current position 221, an upcoming position 222, a point on the last path 211 closest to the upcoming position 222, and a position on the last path 212 that is closest to the point on the last path 211. The crosses on the last path 210 represent past positions of the machine 100 at which GPS positions and associated sensor data was received and stored by the controller 160. In one embodiment of the invention, while at the current position 221, the controller 160 determines, based on the current position 221, a current ground velocity and a delay time interval that is based upon how quickly header adjustments can be made, the upcoming position 222, and may further determine, based upon a width W of any pass, the point on the last path 211 closest to the upcoming position 222. For example, knowing the current position 221, the upcoming position 222 is the current position 221 plus the product of the current ground velocity and the preset delay time interval. Furthermore, the controller 160 may then determine, from the set of stored GPS positions of the last path 210, the position on the last path 212 that is closest to the point on the last path 211, which is also closest to the upcoming position 222. The scope of the present invention covers other methods of determining an upcoming position and a position on the last path that is closest to the upcoming position which may or may not require the use of ground velocity vectors and/or delay time intervals.

Figure 3:
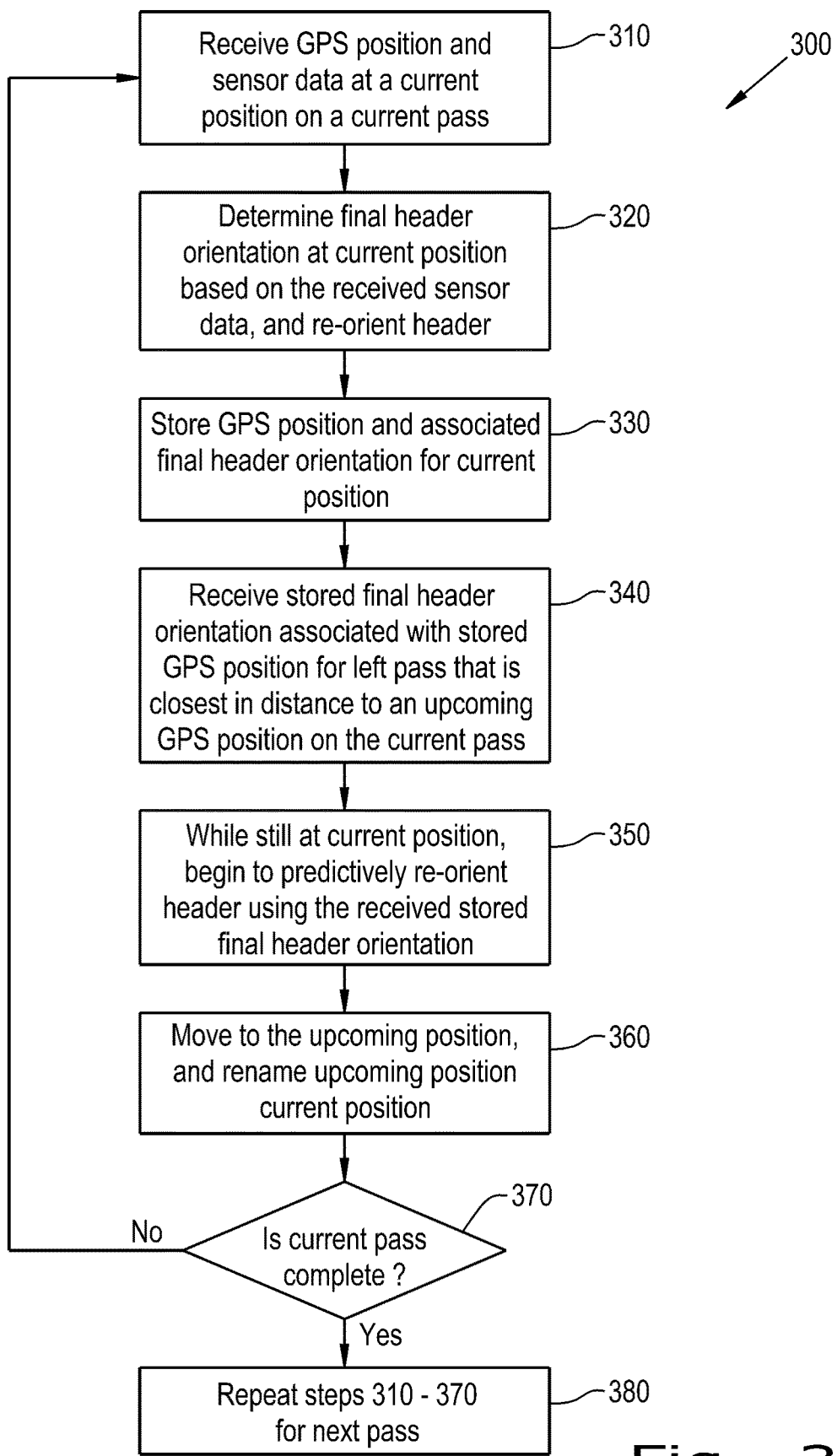
FIG. 3 is a flow chart illustrating an exemplary method performed by the controller of the agricultural vehicle illustrated in FIG. 1, formed in accordance with the present invention.

FIG. 3 is a flow chart illustrating an exemplary method 300 performed by the controller 160 in accordance with an embodiment of the present invention. In step 310, the controller 160 receives GPS position and associated sensor data at a current position on a current pass. For example, and in reference to FIG. 2, when the machine 100 is located at current position 221 on a current pass 220, the controller 160 receives a GPS position from the GPS device 180 and sensor data (e.g., sensor signals from one or more cutter sensors 171 and one or more wheel sensors 172).

In step 320, the controller 160 may re-orient the header 120 at the current position 221, based upon the sensor data received at the current position 221. For example, the controller 160 may reactively fine-tune the orientation of the header 120 based upon the sensor data currently received at the current position 221, resulting in a desired final orientation of the header 120. Re-orientating the header 120 includes one or more of adjusting the height, the lateral tilt, and the fore-aft tilt of the header 120, which includes activating one or more actuators 150A-150C carried by the header 120 and/or feeder 140.

In step 330, the controller 160 stores, in either a controller memory or a memory external to the controller 160, the received GPS position and the associated final orientation of the header 120 for the current position 221 of the machine 100.

In step 340, and while still at the current position 221, the controller 160 receives, from memory, stored final orientation of the header 120 associated with a stored GPS position on a last pass 212 that is closest in distance to an upcoming GPS position on the current pass 222. For example, the controller 160 is configured to determine the upcoming GPS position on the current pass 222 based on, in one embodiment, a current GPS position 221, a current direction of motion, and a fixed length interval, or in another embodiment, based on the current GPS position 221, the current direction of motion, ground speed, and a delay time interval associated with header 120. The delay time interval may be dependent upon the mechanical characteristics of the header 120, and further based upon the various lengths of time required to rotate or lift/lower the header 120 from one position to another. In one embodiment, the delay time interval may be adjustable preset by the operator of the machine 100.

In another embodiment, the controller 160 is configured to determine the stored GPS position on the last pass 212 that is closest in distance to the determined upcoming GPS position on the current pass 222 based upon determining the stored GPS position on the last pass 212 that is closest in distance to the point 211, where the point 211 may be determined based upon a vector of width W (i.e., pass width) extending from the determined upcoming GPS position 222 in a direction perpendicular to the direction of motion of the machine 100 between GPS positions 221 and 222. In this exemplary embodiment, the position 212 is closest to the location 211, and thus the stored position 212 is determined to be the stored GPS position of the last pass that is closest to the upcoming GPS position on the current pass 222.

In step 350, and while still at the current position 221, the controller 160 sends signals to one or more of the actuators 150A-150C of the actuator system 150, based upon the received stored final header orientation associated with the stored GPS position on the last pass that is closest in distance to the upcoming GPS position on the current pass, in order to begin to predictively re-orient the header 120 to a orientation that is optimal for the upcoming position 222. In one embodiment of the invention, and as discussed above in conjunction with FIG. 2, the controller 160 re-orients the header 120 to within some percentage of the received stored final header orientation (i.e., to within some percentage of the received stored final header height and/or tilt values) based upon a current ground speed of the machine 100. In one embodiment, the lower the ground speed, the smaller the percentage difference between the re-oriented header values and the received stored final header orientation values.

In step 360, the machine 100 has moved to the upcoming position 222, and the header 120 is now predictively re-oriented to within some percentage of the received stored final header orientation, which is based upon the ground speed of the machine 100, and for ease of explaining the method, the upcoming position 222 is renamed as the current position.

In step 370, the controller 160 determines whether the current pass 220 is complete. If the current pass 220 is not complete, then the method continues at step 310. If the current pass 220 is complete, then in step 380 a next pass (not shown) is initiated, and steps 310-370 are repeated for the next pass.

It is to be understood that the steps of the method 300 are performed by their respective controller 160 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 160 described herein, such as the method 300, is implemented in software code or instructions which are tangibly stored on a tangible computer readable medium. Upon loading and executing such software code or instructions by the controller 160, the controller 160 may perform any of the functionality of the controller 160 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural vehicle, comprising:
   a chassis;
   a header carried by said chassis, said header including:
      a frame, and
      one or more sensors carried by said frame, said one or more sensors configured for outputting one or more sensor signals associated with an orientation of said header;
   an actuator system including a plurality of actuators linked to said frame and configured for adjusting the orientation of said header;
   a GPS device configured for outputting a GPS position of said vehicle; and
   a controller electrically coupled to said one or more sensors, said actuator system, and said GPS device, said controller, at a first location on a current pass of said vehicle, configured for executing the steps of:

receiving from said one or more sensors, one or more of said sensor signals;

determining a final orientation of said header based upon said received one or more sensor signals;

receiving a GPS position;

storing said final orientation and said associated GPS position in a memory;

receiving from said memory, a final orientation of said header associated with a GPS position at a second location on a last pass that is closest in distance to a GPS position at an upcoming location on the current pass; and activating at least one actuator of said plurality of actuators to re-orient said header based upon said received final orientation of said header associated with said GPS position at said second location before said vehicle arrives at said upcoming location.

2. The agricultural vehicle according to claim 1, wherein said header further includes a cutter, and said one or more sensors comprises one or more cutter sensors generating one or more cutter sensor signals for indicating a height of the cutter from a surface of the current pass.

3. The agricultural vehicle according to claim 2, wherein said header further includes one or more gauge wheels, and wherein said one or more sensors comprises one or more wheel sensors configured to generate one or more wheel sensor signals.

4. The agricultural vehicle according to claim 3, wherein the controller is further configured for determining a fore-aft tilt of the header based upon the one or more wheel sensor signals and the one or more cutter sensor signals.

5. The agricultural vehicle according to claim 3, wherein the controller is further configured for determining a lateral tilt of the header based upon at least two wheel sensor signals associated with at least two wheel sensors.

6. The agricultural vehicle according to claim 1, wherein said orientation of said header further includes a height of said header from a surface of said current pass, a fore-aft tilt of said header, and a lateral tilt of said header.

7. The agricultural vehicle according to claim 1, wherein the controller is further configured for determining said upcoming location on said current pass based upon said current location, a current ground velocity of said machine, and a delay time interval associated with said header.

8. The agricultural vehicle according to claim 1, wherein the controller is further configured for activating at least one actuator of said plurality of actuators to re-orient said header to within a percentage of said received final orientation of said header associated with said GPS position at said second location before said vehicle arrives at said upcoming location, wherein said percentage is based upon a current speed of said agricultural vehicle.

9. The agricultural vehicle according to claim 8, wherein said received final orientation of said header comprises header height and tilt values, and wherein said percentage of said received final orientation of said header comprises said percentage of said header height and tilt values.

10. The agricultural vehicle according to claim 8, wherein said controller is further configured for, when the vehicle arrives at said upcoming location on said current pass:

receiving, from said one or more sensors, one or more second sensor signals;

determining a second final orientation of said header based upon said received one or more second sensor signals;

receiving a second GPS position;

storing storing said second final orientation and said associated second GPS position in said memory; and activating at least one actuator of said plurality of actuators to further re-orient said header based upon said second final orientation of said header.

* * * * *